United States Patent
Deng et al.

(10) Patent No.: US 10,740,986 B2
(45) Date of Patent: Aug. 11, 2020

(54) SYSTEMS AND METHODS FOR RECONSTRUCTING A MOVING THREE-DIMENSIONAL OBJECT

(71) Applicant: QUALCOMM Incorporated, San Diego, CA (US)

(72) Inventors: Yan Deng, San Diego, CA (US); Michel Adib Sarkis, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/118,237

(22) Filed: Aug. 30, 2018

(65) Prior Publication Data

US 2020/0074747 A1    Mar. 5, 2020

(51) Int. Cl.
*G06T 19/20* (2011.01)
*G06T 3/00* (2006.01)
*G06T 15/08* (2011.01)

(52) U.S. Cl.
CPC ............ *G06T 19/20* (2013.01); *G06T 3/0068* (2013.01); *G06T 15/08* (2013.01); *G06T 2200/04* (2013.01); *G06T 2200/08* (2013.01); *G06T 2219/2004* (2013.01); *G06T 2219/2012* (2013.01)

(58) Field of Classification Search
CPC ..... G06T 3/0068; G06T 15/005; G06T 15/08; G06T 17/005; G06T 17/205; G06T 19/20; G06T 2200/04; G06T 2200/08; G06T 2219/2004; G06T 2219/2012
See application file for complete search history.

(56) References Cited

U.S. PATENT DOCUMENTS

| 5,850,352 A * | 12/1998 | Moezzi ............... H04N 13/139 345/419 |
| 9,327,406 B1 | 5/2016 | Hinterstoisser et al. |
| 9,438,891 B2 | 9/2016 | Mannion et al. |
| 9,894,385 B2 | 2/2018 | Heo et al. |

(Continued)

FOREIGN PATENT DOCUMENTS

WO     2017123387 A1    7/2017

OTHER PUBLICATIONS

Guo K., et al., "Real-time Geometry, Albedo and Motion Reconstruction Using a Single RGBD Camera," ACM Transactions on Graphics, 2017, 13 pages.

(Continued)

*Primary Examiner* — King Y Poon
*Assistant Examiner* — Vincent Peren
(74) *Attorney, Agent, or Firm* — Austin Rapp & Hardman, P.C.

(57) ABSTRACT

A method performed by an electronic device is described. The method includes receiving a set of frames. The set of frames describes a moving three-dimensional (3D) object. The method also includes registering the set of frames based on a canonical model. The canonical model includes geometric information and optical information. The method additionally includes fusing frame information of each frame to the canonical model based on the registration. The method further includes reconstructing the 3D object based on the canonical model.

30 Claims, 9 Drawing Sheets

(56) References Cited

U.S. PATENT DOCUMENTS

| | | | |
|---|---|---|---|
| 10,178,366 B2* | 1/2019 | Lucas | G06T 17/00 |
| 10,460,463 B2* | 10/2019 | Whelan | G06T 7/579 |
| 2002/0089500 A1* | 7/2002 | Jennings, Jr. | G06T 19/20 |
| | | | 345/420 |
| 2007/0031064 A1* | 2/2007 | Zhao | G06K 9/00214 |
| | | | 382/285 |
| 2007/0052974 A1* | 3/2007 | Tubic | G01B 21/045 |
| | | | 356/604 |
| 2015/0279083 A1* | 10/2015 | Pradeep | G06T 17/00 |
| | | | 345/419 |
| 2016/0301910 A1* | 10/2016 | Lucas | G06T 17/00 |
| 2017/0206669 A1 | 7/2017 | Saleemi et al. | |
| 2018/0082435 A1* | 3/2018 | Whelan | G06T 7/579 |
| 2019/0213773 A1* | 7/2019 | Lee | G06T 15/005 |
| 2019/0213789 A1* | 7/2019 | Uyyala | G06T 7/215 |

OTHER PUBLICATIONS

Lee S-O., et al., "RGB-D Fusion: Real-time Robust Tracking and Dense Mapping with RGB-D Data Fusion", IEEE/RSJ International Conference on Intelligent Robots and Systems (IROS 2014), Chicago, IL, USA, 14-18, Sep. 2014, pp. 2749-2754.

Li S., et al., "HDRFusion: HDR SLAM Using a Low-Cost Auto-Exposure RGB-D Sensor," International Conference on 3D Vision, Apr. 4, 2016, 16 pages.

Newcombe R.A., et al., "DynamicFusion: Reconstruction and Tracking of Non-rigid Scenes in Real-Time," IEEE Conference on Computer Vision and Pattern Recognition (CVPR), 2015, 10 pages.

* cited by examiner

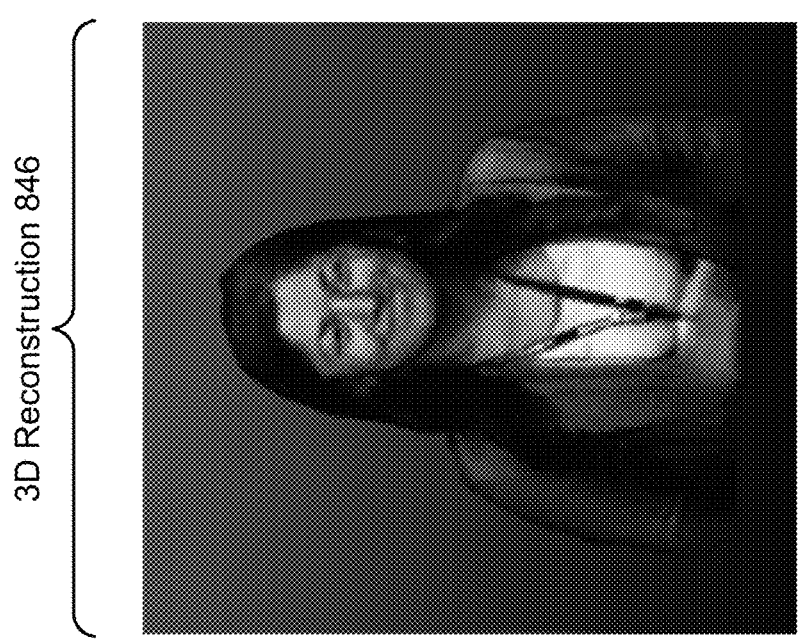
FIG. 8

SYSTEMS AND METHODS FOR RECONSTRUCTING A MOVING THREE-DIMENSIONAL OBJECT

FIELD OF DISCLOSURE

The present disclosure relates generally to electronic devices. More specifically, the present disclosure relates to systems and methods for reconstructing a moving three-dimensional (3D) object.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices, action cameras, surveillance cameras, mounted cameras, connected cameras, robots, drones, healthcare equipment, set-top boxes, etc.) capture and/or utilize sensor data. For example, a smart phone may capture and/or process still and/or video images. Processing sensor data may demand a relatively large amount of time, memory, and energy resources. The resources demanded may vary in accordance with the complexity of the processing.

In some cases, sensor data may be noisy and/or may exhibit inaccuracies. For example, some sensor data may suffer from low signal-to-noise ratio (SNR) and/or drift. As can be observed from this discussion, systems and methods that improve sensor data processing may be beneficial.

SUMMARY

A method performed by an electronic device is described. The method includes receiving a set of frames. The set of frames describes a moving three-dimensional (3D) object. The method also includes registering the set of frames based on a canonical model. The canonical model includes geometric information and optical information. The method further includes fusing frame information of each frame to the canonical model based on the registration. The method additionally includes reconstructing the 3D object based on the canonical model. Fusing the frame information may include incrementally updating at least one tensor of the canonical model by performing weighted fusing of the frame information to the canonical model.

The method may include fitting a temporal mean Gaussian model to each voxel of a set of voxels of the canonical model and associated pixels in the set of frames. Each voxel of the set of voxels may have an associated tensor.

Each tensor may include a distance value, a mean of a feature vector, a mean of a product between the feature vector and a transpose of the feature vector, and an update number. The distance value may represent at least a portion of the geometric information and the mean of the feature vector may represent at least a portion of the optical information.

Registering a frame of the set of frames may include determining a distance metric between optical data of the frame and the optical information of the canonical model. Registering the frame may further include determining a point-to-plane distance between the canonical model and a depth for the frame.

The method may include refining a feature of the optical information before reconstructing color of the 3D object. The method may include reconstructing color of the 3D object based on the canonical model that includes recoverable color. Reconstructing the 3D object based on the canonical model may include extracting an iso-surface of the 3D object from a volume of the canonical model and extracting color from the canonical model that is associated with the iso-surface to produce a reconstructed 3D object.

An electronic device is also described. The electronic device includes a memory. The electronic device also includes a processor coupled to the memory. The processor is configured to receive a set of frames. The set of frames describes a moving three-dimensional (3D) object. The processor is also configured to register the set of frames based on a canonical model. The canonical model includes geometric information and optical information. The processor is further configured to fuse frame information of each frame to the canonical model based on the registration. The processor is additionally configured to reconstruct the 3D object based on the canonical model.

A non-transitory tangible computer-readable medium storing computer executable code is also described. The computer-readable medium includes code for causing an electronic device to receive a set of frames. The set of frames describes a moving three-dimensional (3D) object. The computer-readable medium also includes code for causing the electronic device to register the set of frames based on a canonical model. The canonical model includes geometric information and optical information. The computer-readable medium further includes code for causing the electronic device to fuse frame information of each frame to the canonical model based on the registration. The computer-readable medium additionally includes code for causing the electronic device to reconstruct the 3D object based on the canonical model.

An apparatus is also described. The apparatus includes means for receiving a set of frames. The set of frames describes a moving three-dimensional (3D) object. The apparatus also includes means for registering the set of frames based on a canonical model. The canonical model includes geometric information and optical information. The apparatus further includes means for fusing frame information of each frame to the canonical model based on the registration The apparatus additionally includes means for reconstructing the 3D object based on the canonical model.

BRIEF DESCRIPTION OF THE DRAWINGS

FIG. 8 is a diagram illustrating an example of a frame and a 3D reconstruction.

DETAILED DESCRIPTION

Some configurations of the systems and methods disclosed herein may be implemented in order to produce a three-dimensional (3D) model of an object (e.g., one or more objects). For example, some configurations of the systems and methods disclosed herein relate to non-local mean online registration and color texture reconstruction via fusion of moving features.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
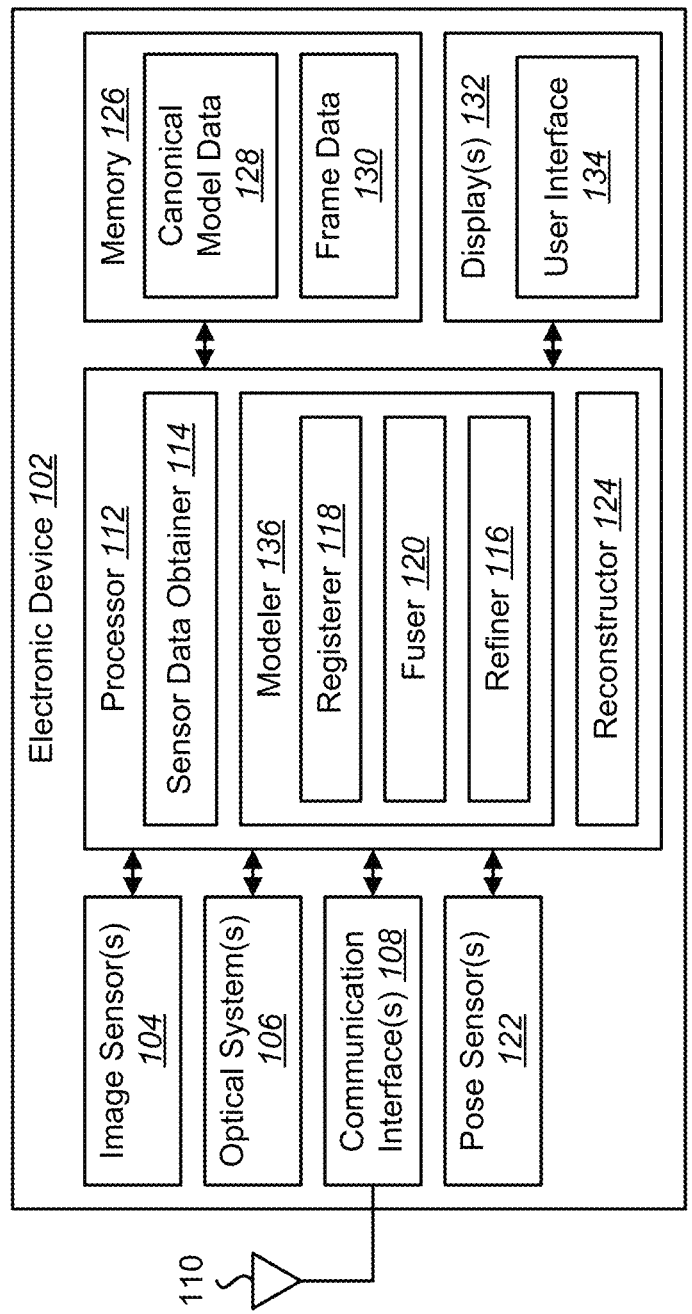
FIG. 1 is a block diagram illustrating one example of an electronic device in which systems and methods for reconstructing a moving three-dimensional (3D) object may be implemented.

FIG. 1 is a block diagram illustrating one example of an electronic device 102 in which systems and methods for reconstructing a moving 3D object may be implemented. Examples of the electronic device 102 include cameras, video camcorders, digital cameras, cellular phones, smartphones, tablet devices, personal cameras, wearable cameras, virtual reality devices (e.g., headsets), augmented reality devices (e.g., headsets), mixed reality devices, action cameras, surveillance cameras, mounted cameras, connected cameras, vehicles (e.g., semi-autonomous vehicles, autonomous vehicles, etc.), automobiles, robots, aircraft, drones, unmanned aerial vehicles (UAVs), servers, computers (e.g., desktop computers, laptop computers, etc.), network devices, healthcare equipment, gaming consoles, appliances, etc. In some configurations, the electronic device 102 may be integrated into one or more devices (e.g., vehicles, drones, mobile devices, etc.). The electronic device 102 may include one or more components or elements. One or more of the components or elements may be implemented in hardware (e.g., circuitry), a combination of hardware and software (e.g., a processor with instructions), and/or a combination of hardware and firmware.

In some configurations, the electronic device 102 may include a processor 112, a memory 126, one or more displays 132, one or more image sensors 104, one or more optical systems 106, one or more communication interfaces 108, and/or one or more pose sensors 122. The processor 112 may be coupled to (e.g., in electronic communication with) the memory 126, display(s) 132, image sensor(s) 104, optical system(s) 106, communication interface(s) 108, and/or pose sensor(s) 122. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may be configured to perform one or more of the functions, procedures, methods, steps, etc., described in connection with one or more of FIGS. 1-9. Additionally or alternatively, the electronic device 102 may include one or more of the structures described in connection with one or more of FIGS. 1-9.

The memory 126 may store instructions and/or data. The processor 112 may access (e.g., read from and/or write to) the memory 126. Examples of instructions and/or data that may be stored by the memory 126 may include canonical model data 128, frame data 130 (e.g., image data, pixel values, red-green-blue (RGB) values, radiance values, depth image data, and/or thermal image data, frame position data and/or frame orientation data, etc.), sensor data obtainer 114 instructions, modeler 136 instructions, registerer 118 instructions, fuser 120 instructions, refiner 116 instructions, reconstructor 124 instructions, and/or instructions for other elements, etc.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. For example, the communication interface 108 may enable one or more kinds of wireless (e.g., cellular, wireless local area network (WLAN), personal area network (PAN), etc.) communication. Additionally or alternatively, the communication interface 108 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface(s) 108 may send information (e.g., canonical model information, pose information, image information, location information, object detection information, map information, etc.) to and/or receive information from another electronic device (e.g., a vehicle, a smart phone, a camera, a display, a robot, a remote server, etc.).

In some configurations, the electronic device 102 (e.g., sensor data obtainer 114) may obtain (e.g., receive) one or more frames (e.g., image frames, video, depth image frames, and/or thermal image frames, etc.). The one or more frames may indicate data captured from an environment (e.g., one or more objects and/or background).

In some configurations, the electronic device 102 may include one or more image sensors 104 and/or one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations. The one or more image sensor(s) 104 may be used in conjunction with the optical system(s) 106 or without the optical system(s) 106 depending on the implementation. In some implementations, the electronic device 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the electronic device 102 may include multiple optical system(s) 106 and/or multiple image sensors 104. For example, the electronic device 102 may include two or more lenses in some configurations. The lenses may have the same focal length or different focal lengths.

In some examples, the image sensor(s) 104 and/or the optical system(s) 106 may be mechanically coupled to the electronic device 102 or to a remote electronic device (e.g., may be attached to, mounted on, and/or integrated into the body of a vehicle, the hood of a car, a rear-view mirror mount, a side-view mirror, a bumper, etc., and/or may be integrated into a smart phone or another device, etc.). The image sensor(s) 104 and/or optical system(s) 106 may be linked to the electronic device 102 via a wired and/or wireless link in some configurations.

Examples of image sensor(s) 104 may include optical image sensors, depth image sensors, thermal image sensors, red-green-blue-depth (RGBD) sensors, etc. For example, the electronic device 102 may include one or more depth sensors (e.g., time-of-flight cameras, lidar sensors, etc.) optical sensors (e.g., two-dimensional (2D) image sensors, 3D image sensors, etc.) and/or one or more thermal sensors (e.g., infrared thermal sensors). The image sensor(s) 104 may capture one or more image frames (e.g., optical image frames, depth image frames, thermal image frames, optical/depth frames, etc.). As used herein, the term "optical" may denote visual spectrum information. For example, an optical sensor may sense visual spectrum data. As used herein, the term "depth" may denote a distance between a depth sensor and an object. For example, a depth sensor may sense depth data (e.g., one or more distances between the depth sensor and an object). It should be noted that the frame data 130 may include one or more types of data (e.g., optical data, depth data, time-of-flight data, position data, and/or orientation data, etc.) associated with one or more times or time ranges. For example, a "frame" may correspond to an instant of time or a range of time in which data corresponding to the frame is captured. Different frames may be separate or overlapping in time. Frames may be captured at regular periods, semi-regular periods, or aperiodically. In some configurations, the sensor(s) 104, 122 may initially have an unknown position and/or orientation.

In some implementations, the electronic device 102 may include multiple optical system(s) 106 and/or multiple image sensors 104. Different lenses may each be paired with separate image sensors 104 in some configurations. Additionally or alternatively, two or more lenses may share the same image sensor 104. It should be noted that one or more other types of sensors may be included and/or utilized to produce frames in addition to or alternatively from the image sensor(s) 104 in some implementations.

In some configurations, a camera may include at least one sensor and at least one optical system. Accordingly, the electronic device 102 may be one or more cameras, may include one or more cameras, and/or may be coupled to one or more cameras in some implementations.

In some configurations, the electronic device 102 may request and/or receive the one or more frames from another device (e.g., one or more external sensors coupled to the electronic device 102). In some configurations, the electronic device 102 may request and/or receive the one or more frames via the communication interface 108. For example, the electronic device 102 may or may not include an image sensor 104 and/or pose sensor 122 and may receive frames (e.g., optical image frames, depth image frames, thermal image frames, position data, and/or orientation data, etc.) from one or more remote devices. In some configurations, no prior position and/or orientation (e.g., pose) data may be utilized. For example, a pose sensor 122 may not be included and/or utilized in some implementations. In some configurations, position data and/or orientation data from a pose sensor 122 may be utilized to help initialize the global rigid motion of the non-rigid registration between frames and help simplify the problem. It should be noted that non-rigid motion may include two parts: global rigid motion and non-rigid motion. Global rigid motion may be shared identical rotation and translation (from canonical model to live frame) among all moving objects contained in the canonical model. If all the objects are still and the camera is moving, for example, the shared rotation and translation may be the inversion of the camera pose as an example of global rigid motion.

The electronic device may include one or more displays 132. The display(s) 132 may present optical content (e.g., one or more image frames, video, still images, graphics, virtual environments, three-dimensional (3D) image content, 3D models, symbols, characters, etc.). The display(s) 132 may be implemented with one or more display technologies (e.g., liquid crystal display (LCD), organic light-emitting diode (OLED), plasma, cathode ray tube (CRT), etc.). The display(s) 132 may be integrated into the electronic device 102 or may be coupled to the electronic device 102. For example, the electronic device 102 may be a virtual reality headset with integrated displays 132. In another example, the electronic device 102 may be a computer that is coupled to a virtual reality headset with the displays 132. In some configurations, the content described herein (e.g., frames, 3D models, etc.) may be presented on the display(s) 132. For example, the display(s) 132 may present an image depicting a 3D model of an environment (e.g., one or more objects). In some configurations, all or portions of the frames that are being captured by the image sensor(s) 104 may be presented on the display 132. Additionally or alternatively, one or more representative images (e.g., icons, cursors, virtual reality images, augmented reality images, etc.) may be presented on the display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera and may detect user gestures (e.g., hand gestures, arm gestures, eye tracking, eyelid blink, etc.). In another example, the electronic device 102 may be linked to a mouse and may detect a mouse click. In yet another example, the electronic device 102 may be linked to one or more other controllers (e.g., game controllers, joy sticks, touch pads, motion sensors, etc.) and may detect input from the one or more controllers.

In some configurations, the electronic device 102 and/or one or more components or elements of the electronic device 102 may be implemented in a headset. For example, the electronic device 102 may be a smartphone mounted in a headset frame. In another example, the electronic device 102 may be a headset with integrated display(s) 132. In yet another example, the display(s) 132 may be mounted in a headset that is coupled to the electronic device 102.

In some configurations, the electronic device 102 may be linked to (e.g., communicate with) a remote headset. For example, the electronic device 102 may send information to and/or receive information from a remote headset. For instance, the electronic device 102 may send information (e.g., pose data, frame data, one or more images, video, one or more frames, graph data, 3D model data, etc.) to the headset and/or may receive information (e.g., captured frames) from the headset.

In some configurations, the electronic device 102 may include one or more pose sensors 122. Examples of pose sensor(s) 122 may include one or more accelerometers, tilt sensors, gyros, Global Positioning System (GPS) receivers, motion sensors, inertial measurement units (IMUs), image sensors, etc. The pose sensor(s) 122 may be utilized to detect one or more poses of the electronic device 102 and/or of the image sensor(s) 104. In some configurations, a pose may include position and/or orientation of the electronic device 102 and/or image sensor(s) 104 (e.g., rotations in one or more dimensions and/or translations in one or more dimensions). In some implementations, one or more image sensor(s) 104 may be utilized as pose sensor(s) 122 and/or an image-based (e.g., RGB-based, RGBD-based, etc.) algorithm may be utilized to estimate pose. Additionally or alternatively, the image sensor(s) 104 and pose sensor(s) 122 may be mounted on the same rigid frame (e.g., rigid mounting frame, rigid vehicle frame, etc.).

In some configurations, the pose sensor(s) 122 may include one or more accelerometers and/or one or more gyroscopes for detecting pose. The accelerometer(s) may detect acceleration in one or more directions (e.g., along one or more axes), which may be utilized to determine translation in one or more dimensions. The gyroscope(s) may detect orientation. For example, the gyroscope(s) may determine roll, pitch, and/or yaw values. In some implementations, the pose sensor(s) 122 may provide three-dimensional (3D) accelerometer information and 3D gyroscope information that indicate pose.

The pose(s) may be relative to a coordinate system. For example, the pose(s) may be expressed as translational values in three dimensions (e.g., x, y, and z) and rotational values in three dimensions (e.g., yaw, pitch, and roll). In some configurations, the coordinate system may correspond to the Earth (e.g., in Earth coordinates, World Geodetic System 1984 (WGS84) coordinates, Earth-centered Earth-fixed (ECEF) coordinates, east north up (ENU) coordinates, etc.). In some configurations, the coordinate system may be arbitrary (e.g., correspond to an initial pose, correspond to a predetermined location and/or orientation, etc.). In some configurations, the coordinate system may partially correspond to the Earth (e.g., a vertical axis may correspond to a gravity vector and horizontal axes may correspond to an initial pose, etc.).

The processor 112 may include and/or implement a sensor data obtainer 114, a modeler 136, a registerer 118, a fuser 120, a refiner 116, and/or a reconstructor 124. It should be noted that one or more of the elements illustrated in the electronic device 102 and/or processor 112 may be optional. For example, the processor 112 may not include and/or implement the reconstructor 124 in some configurations. Additionally or alternatively, one or more of the elements illustrated in the processor 112 may be implemented separately from the processor 112 (e.g., in other circuitry, on another processor, on a separate electronic device, etc.).

The processor 112 may include and/or implement a sensor data obtainer 114. The sensor data obtainer 114 may obtain sensor data from one or more sensors. For example, the sensor data obtainer 114 may obtain (e.g., receive) one or more frames (e.g., image frames, depth image frames, and/or thermal image frames, etc.) and/or one or more poses. For instance, the sensor data obtainer 114 may receive image data from one or more image sensors 104 included in the electronic device 102 and/or from one or more remote image sensors. One or more of the frames may describe a moving 3D object. A frame may describe an object if the frame includes information (e.g., pixel information, depth information, etc.) corresponding to the object and/or depicts the object. For example, the frames may include pixel information corresponding to one or more non-rigid objects (e.g., one or more moving objects) and/or depth information corresponding to the one or more non-rigid objects (e.g., the one or more moving objects).

Additionally or alternatively, the sensor data obtainer 114 may receive pose data from one or more pose sensors 122 included in the electronic device 102 and/or from one or more remote pose sensors. For example, the sensor data obtainer 114 may obtain one or more frames and/or one or more poses from one or more remote devices via the communication interface(s) 108. As used herein, a "pose" and/or "pose data" may include position information and/or orientation information. For example, a sensor pose or camera pose may indicate a pose of the sensor(s) and/or camera(s) when a frame is captured.

It should be noted that some frames and/or poses may differ. For example, the image sensor(s) 104 and/or the pose sensor(s) 122 may move between some frames. In some approaches, the image sensor(s) 104 and/or pose sensor(s) 122 may move due to motion of the electronic device 102 (e.g., smart phone, camera, vehicle, robot, etc.).

In some configurations, the sensor data obtainer 114 may determine one or more key frames from the obtained frames. One or more frame criteria may be utilized to determine the key frame(s). For example, the sensor data obtainer 114 may determine the key frame(s) based on one or more frame spatial criteria, frame time criteria, and/or frame comparison criteria. In some approaches, a frame spatial criterion may indicate a threshold distance between poses for key frames. For example, two frames may be determined as key frames if there is at least a threshold distance between the poses (e.g., poses of sensor(s) that captured the frames and/or poses of a device that captured the frames) corresponding to the frames. In some approaches, a frame time criterion may indicate a threshold time between key frames. For example, two frames may be determined as key frames if there is at least a threshold time between the capture times of the frames. In some approaches, a frame number criterion may indicate a threshold number of frames between key frames. For example, two frames may be determined as key frames if there is at least a threshold number of frames between the frames. In some approaches, a frame comparison criterion may indicate a threshold content difference between key frames. For example, two frames may be determined as key frames if there is at least a threshold difference in content (e.g., color, intensity, and/or features, etc.) between the frames. In some configurations, a combination of criteria may be utilized. For example, frames may be determined as key frames if there is a threshold distance or a threshold time between the frames. In another example, frames may be determined as key frames if there is both a threshold distance and a threshold time between the frames. In some configurations, one or more of the operations described herein may be performed only on a set of key frames (and not all captured frames, for example). In some configurations, one or more of the operations described herein may be performed for all frames. In some approaches, one or more of the operations described herein may be performed "online," while additional data (e.g., frames) are being obtained. In some approaches, one or more of the operations described herein may be performed "offline," after all data in a set has been obtained.

The processor 112 may include and/or implement a modeler 136. The modeler 136 may produce and/or update a canonical model. The canonical model may be represented by and/or stored as the canonical model data 128 in the memory. A canonical model may be a representation of a volume (e.g., 3D space). For example, a canonical model may include a set of voxels that represent the volume and that may represent one or more objects in the volume. One or more objects in the volume may be represented by information associated with each voxel. Each voxel of the set of voxels may be included in the canonical model. In some configurations, the canonical model may include geometric information and optical information. For example, the canonical model may include geometric information and optical information in the sense that each voxel of the canonical model may be associated with geometric information and optical information. In some configurations, a tensor may be associated with each voxel of the canonical model. A tensor is a mathematical object that includes a number of components.

In some configurations of the systems and methods disclosed herein, a tensor may include a distance value, a mean of a feature vector, a mean of a product between a feature vector and a transpose of the feature vector, and an update number. An example of a tensor is given in Equation (1).

$$\{d, \mu_f, \mu_{ff^T}, k\} \quad (1)$$

In Equation (1), d is a distance value, f is a feature (e.g., feature vector), $\mu_f$ is a mean of the feature (e.g., feature vector), $\mu_{ff^T}$ is a mean of a product between a feature vector and a transpose of the feature vector, and k is an update number (e.g., a number of times the canonical model or tensor has been updated).

The distance value d may indicate a location of an object in the canonical model. In one example, d is a truncated distance function value, where a voxel in an object interior may be represented as d=−1, a voxel on the surface of an object may be represented as d=0, and/or a voxel of an exterior (e.g., outside an object) may be represented as d=1. Other configurations of d may be implemented (e.g., a non-truncated distance function value). In some approaches, d may be determined based on depth measurements. For example, the modeler 136 may assign d values in accordance with the depth measurements, where tensors of voxels at depths where an object is detected are assigned a value (e.g., d=0), tensors of voxels at depths where an object is not detected are assigned a value (e.g., d=1), and/or tensors of voxels at depths behind where an object is detected are assigned a value (e.g., d=−1). In the canonical model, one or more d values may be or may correspond to the geometric information.

In some configurations, the feature (or feature vector) f may represent and/or include a color-recoverable feature (e.g., a feature from which color information may be recovered). Examples of the feature f may include an RGB vector, YUV vector (e.g., luminance (Y) and chrominance components (U or red-luminance difference) and (V or blue-luminance difference)), and radiance, etc. The mean of the feature vector $\mu_f$ may be a mean of feature vectors for the voxel over time (e.g., over frames, observations, etc.). The mean of the product between a feature vector and the transpose of the feature vector may be a mean of the product between a feature vector and the transpose of the feature vector for the voxel over time.

The modeler 136 may initialize the canonical model. In some configurations, the canonical model may be initialized based on an initial frame. For example, the sensor data obtainer 114 may obtain an initial frame of data (e.g., depth data and/or optical data). The modeler 136 may initialize the canonical model by determining, based on the initial frame of data, the tensors associated with the voxels of the canonical model. For instance, the modeler 136 may determine a tensor associated with each voxel, where each tensor includes a distance value, mean of the feature, mean of the square of the feature, and update number as $\{d, \mu_R, \mu_{R^2}, k\}$, where d is the truncated distance function value, $\mu_R$ is a mean of pixel radiance, $\mu_{R^2}$ is a mean of radiance squared, and k is an update number. For example, radiance may be an example of the feature. Each voxel of the canonical model may accordingly include a tensor. Initializing the canonical model may establish a 3D volume (e.g., coordinate space), which may be updated based on additional observations (e.g., frames).

The processor 112 (e.g., modeler 136) may include and/or implement a registerer 118. The registerer 118 may register one or more frames (e.g., a set of frames) based on the canonical model. As described herein, the canonical model may include geometric information and optical information. For example, the registerer 118 may utilize a combination of geometric information and optical information to register (e.g., align) the canonical model and one or more frames. This approach may be distinct from other techniques, where optical information (e.g., color information) is not utilized in the registration procedure and/or where optical information is transformed based on a previous purely geometrical registration procedure.

In some configurations, the modeler 136 (e.g., registerer 118) may fit a temporal mean Gaussian model to each voxel of the set of voxels of the canonical model and associated pixels in one or more frames (e.g., a set of frames). For example, the temporal mean Gaussian model may be an independent non-local mean Gaussian model (e.g., not identical with another Gaussian model in some cases) that may be fitted to each voxel of the canonical model and associated pixels in the moving frames over the observing time. Non-identical Gaussian models may have different means and/or different standard deviations. In some configurations, the corresponding feature in each frame is an observation (e.g., data) of the associated Gaussian model in accordance with Equation (2). In some examples, Equation (2) may be a cost function.

$$G(v, u'')(f(u'') - \mu_f(v))' \Sigma^{-1}(f(u'') - \mu_f(v)) \quad (2)$$

In Equation (2), v is a voxel of the canonical model, u'' is an associated pixel in an $n^{th}$ frame, and f is the feature (e.g., feature vector) as described herein. In Equation (2), ' denotes transpose. $G(v, u'')$ is a correspondence map. For example, a correspondence map is a function that may indicate whether variables are associated. In a "hard" correspondence approach, for example, if v and u'' are associated (e.g., correspond to each other), then $G(v, u'')=1$. Otherwise, $G(v, u'')=0$. For instance, a hard correspondence approach may consider two possible values that represent association or non-association. It should be noted that other approaches for the correspondence map may be utilized, where $G(v, u'')$ is a "soft" value (e.g., between 0 and 1) based on an amount of correspondence and/or probability of correspondence between v and u'' (e.g., a likelihood that variables are associated). The modeler 136 (e.g., registerer 118) may determine the correspondence map. In some configurations, the registerer 118 may register (e.g., align) an incoming frame (e.g., $n^{th}$ frame) using a cost function (e.g., Equation (2)).

In some approaches for registration, the registerer 118 may determine (e.g., extract) an observed surface sampling from the canonical model. The observed surface sampling may be utilized to register the frame and the canonical model. As described in greater detail below, the registerer 118 may determine an observed surface sampling through a previous frame view direction. For example, the registerer 118 may perform marching cubes first to extract the surface of the object and may then apply a previous warping to the extracted surface which leads to the surface sampling from the previous view directions. For instance, marching cubes is an algorithm for determining a mesh (e.g., polygon mesh) based on values of voxels. The latest non-rigid transformation (T) obtained from the registration may be used to perform the warping.

In some configurations, performing registration (e.g., rigid and/or non-rigid registration by the registerer 118) may include determining a point-to-plane distance between the canonical model and a depth for the frame and/or determining a distance metric between optical data of the frame and the optical information of the canonical model. In some configurations, a point-to-plane distance is a distance between a point (e.g., vertex of the canonical model) and a plane (e.g., a surface plane represented by the depth). For example, a point to plane distance between a canonical model sampling (e.g., observed surface sampling) and a current depth (e.g., a depth measurement of the $n^{th}$ frame) via a correspondence map may be determined in accordance with Equation (3).

$$G(v,u^n)(T^n(v)-\Pi(u^n))'n(\Pi(u^n)) \quad (3)$$

In Equation (3), ' denotes transpose and $T^n(v)$ is a (current frame, for example) transform or warping between the canonical model and a frame (e.g., frame of depth measurements).

In some configurations, performing registration (e.g., rigid and/or non-rigid registration by the registerer 118) may include determining a distance metric between the optical information of the canonical model and the optical data of a frame. For example, rigid registration may preserve relative structure and/or non-rigid registration may allow structural flexibility in registration. In some configurations, a distance metric between the optical information (e.g., a mean normalized radiance of a sampling) of the canonical model and optical data (e.g., current normalized radiance) of the moving frame may be determined in accordance with Equation (4).

$$G(v, u^n) \frac{\|R(u^n) - \mu_R(v)\|}{2\sigma_{R^2}(v)} \quad (4)$$

In Equation (4), $R(u^n)$ is the normalized radiance of a sampling (e.g., $n^{th}$ frame), $\mu_R(v)$ is a mean normalized radiance of a voxel of the canonical model, and $\sigma_{R^2}(v)$ is the standard deviation of a squared normalized radiance of the voxel. It should be noted that although Equation (4) is based on radiance, other distance metrics based on other optical information (e.g., RGB, YUV, etc.) may be similarly determined and/or utilized in accordance with the systems and methods disclosed herein.

In some approaches, the registerer 118 may perform registration based on the point-to-plane distance and/or the distance metric (e.g., Gaussian-based distance). For example, registration may be performed by minimizing the point-to-plane distance and/or the distance metric. For example, the point-to-plane distance and the distance metric (e.g., Equations (3) and (4)) may be combined (e.g., summed, combined as a weighted sum, etc.) to form an energy function. The registerer 118 may perform registration by minimizing the energy function with respect to the transformation or warping $T^n$.

In some approaches, a technique may be utilized to simplify registration. The technique may include utilizing a transformation or warping function from a previous frame (e.g., $T^{n-1}$ or a previous frame warp). For example, when performing marching cubes when extracting the observed surface, that surface is still in the canonical model (e.g., canonical space). In some configurations, performing marching cubes may include extracting a polygon mesh of an iso-surface from a 3D discrete scale field. An iso-surface may be a surface formed via connecting the voxels with the same discrete value. For example, the 3D discrete scale field may correspond to the truncated signed distance function (TSDF) volume (e.g., truncated distance associated with the canonical model). In some approaches, the iso-value used may be 0. To simplify the non-rigid registration, the registerer 118 may use the transformation or warping function from the last frame (e.g., $T^{n-1}$) to transform or warp the canonical model (e.g., the extracted surface) to the previous frame's space. Then, the registerer 118 may perform registration between the warped canonical model and the current frame. In this approach, an additional transformation (e.g., $\Delta T$ or a delta warp) may be performed. For example, the registerer 118 may compose $\Delta T$ transformation with the $T^{n-1}$ transformation to get the current transformation $T^n$. This may be performed in accordance with Equation (5).

$$T^n = T^{n-1} \circ \Delta T \quad (5)$$

This technique may simplify registration by bringing the canonical model closer (to the current frame) and then performing the registration (instead of just non-rigidly registering between the canonical model to the current frame, for example). This may be beneficial since the canonical model and the current frame may be very different in some cases, which may make registration difficult without prior information. Accordingly, frame n−1 may be some prior information that may help bring the canonical model to another other space that allows the motion between the warped canonical model and n-th frame to be small. It should be noted that this simplification technique may not be utilized and/or implemented in some configurations, in which case direct registration may be performed between the canonical model and the current frame.

It should be noted that non-rigid registration may be accomplished either with model-to-frame or frame-to-model approaches, where non-rigid registration may be an algorithm to non-rigidly register two frames. Model-to-frame approaches may warp from a fixed and referenced (e.g., virtual) space to a live and moving space. Frame-to-model approaches may warp from a live and moving space to a fixed and referenced space. Some configurations of the systems and methods (e.g., algorithms) disclosed herein use model-to-frame non-rigid registration instead of a frame-to-model approach. One reason that model-to-frame non-rigid registration may be utilized is to better suit 3D reconstruction of the moving object. As used herein, the term "moving" refers to non-rigid motion. If an object contains only rigid motion, the whole space of the object may be warped by a rotation and translation. If the object is non-rigidly moving, however, utilizing only a rotation and translation to model the warping of the whole object may be inadequate. For example, if a person moves their head to one side of their shoulder, although the head is mostly moving rigidly (ignoring any small facial expression change), the whole body is moving non-rigidly since the head is moving relative to the part below the neck, which is still. Accordingly, there will be different transformations associated with different parts of the body, and the movement regarding the whole body cannot be modeled by only one rotation and translation. Since the transformation associated with non-rigid registration is more complicated, the problem is difficult to solve.

A good initializing guess of the non-rigid motion may help with the non-linear optimization involved in the non-rigid registration. For most natural motion, it may be assumed that the motion between two consecutive frames is very similar. Thus, the non-rigid motion between the canonical model and the $n-1^{th}$ frame may be used as an initial guess of the non-rigid motion between the canonical model and the $n^{th}$ frame. In an approach where frame-to-model non-rigid registration is used, the transformation may be modeled based on the frame space. The frame space is a geometrical space relative to the frame. However, the frame space of $n-1^{th}$ frame and $n^{th}$ frame are different in that case. Thus, it may not be possible to directly use the motion from the $n-1^{th}$ frame to the canonical model as the initializing motion from the $n^{th}$ frame to the canonical model due to the different frame spaces. In other approaches, the canonical model may remain fixed during scanning. Thus, if model-to-frame registration is utilized, the motion from the canonical model to the $n-1^{th}$ frame may be directly used as the initializing guess of motion from the canonical model to the $n^{th}$ frame.

The processor 112 (e.g., modeler 136) may include and/or implement a fuser 120. The fuser 120 may fuse one or more frames (e.g., data from one or more frames) with the canonical model. For example, the fuser 120 may merge one or more point clouds of one or more frames with the canonical model (e.g., frame data 130 with canonical model data 128). For instance, when a frame (e.g., optical data and/or depth data) is registered with the canonical model (thus having determined the actual mapping between the canonical model and the frame, for example), the data from the frame may be added to the canonical model. The fuser 120 may fuse frame information (e.g., geometry information and/or optical information) to the canonical model based on the registration. For example, the fuser 120 may fuse information from one or more registered frames to the canonical model. Performing fusion may include fusing selected frame information (e.g., geometry information, optical information, etc.) to the canonical model and/or updating the tensor associated with each voxel. For example, the fuser 120 may update one or more tensors associated with the canonical model by fusing one or more selected features (e.g., geometry features and/or optical features, etc.) of one or more frames to the canonical model based on the registration. In some configurations, the fuser 120 may incrementally update at least one tensor of the canonical model by performing weighted fusing of the frame information to the canonical model (for one or more frames, for example).

A general formula for fusion may be expressed in accordance with Equation (6) or (7):

$$\mu_f = \alpha(k)\mu_f + (1-\alpha(k))f \tag{6}$$

$$\mu_{ff^T} = \alpha(k)\mu_{ff^T} + (1-\alpha(k))ff^T \tag{7}$$

In Equations (6) and (7), $\alpha$ is a weight introduced to update the mean with new available data from the registered frames. If current data is not reliable, $\alpha$ may be greater than $(1-\alpha)$ (e.g., $\alpha$ may be large such that $(1-\alpha)$ is small). The contribution of current data to the incremental mean then would be relatively small. It should be noted that with the update, $k=k+1$. In some examples, fusion may be expressed in accordance with Equation (8).

$$\mu_R = \alpha(k)\mu_R + (1-\alpha(k))R \text{ and } \mu_{R^2} = \alpha(k)\mu_{R^2} + (1-\alpha(k))R^2 \tag{8}$$

In Equation (8), where $\alpha$ is a weight introduced to calculate the incremental mean (e.g., update the mean). This formula depicts a specific way to update the radiance of the canonical model (e.g., part of the tensor). It should be noted that with the update, $k=k+1$. This may be different from TSDF fusion, which may be used only for truncated distance function (e.g., pure geometry) fusion.

Once registration and/or fusion is performed (e.g., for a frame), the canonical model may include geometry information and color recoverable information (e.g., radiance). Accordingly, the feature(s) associated with extracted vertices may be utilized to reconstruct the final color texture.

The processor 112 (e.g., modeler 136) may include and/or implement a refiner 116 in some configurations. The refiner 116 may refine optical information (e.g., refine an optical feature, refine radiance information, etc.). In some approaches, refinement may be performed before color reconstruction and/or final texture mapping. For example, because the spatial smoothness of some of the data may be broken due to the registration (because $\mu_f$ or $\mu_R$ may be a moving mean that can be influenced by registration error and/or because optical information may include noise, for instance), refinement may help to increase accuracy in the final reconstruction. In some configurations, the refinement may be performed in accordance with Equation (9).

$$f^* = \arg\min_f \Sigma_i\{(f(i)-\mu_{f_{curr}}(i))^2 + \lambda\Sigma_{j\in N(i)}w_{ij}(f(i)-f(j))^2\}, \tag{9}$$

where $w_{ij} = \langle \hat{n}_i, \hat{n}_j \rangle$

In Equation (9), i is the index of a voxel, j is the index of a neighboring voxel, $\mu_{f_{curr}}$ is a current feature stored in the canonical model, $f^*$ is a refined feature, $\hat{n}$ is the normal of a voxel, and $\lambda$ is a Lagrange parameter. In Equation (9), the second term $(\lambda\Sigma_{j\in N(i)}w_{ij}(f(i)-f(j))^2)$ enforces a geometry constraint among f. When the curvature is small, the smoothness constraint is enforced. Otherwise, the smoothness constraint is relaxed.

In some configurations, a radiance refinement may be performed in accordance with Equation (10).

$$\arg\min_f \Sigma_i\{(f(i)-\mu_R(i))^2 + \lambda\Sigma_j w_{ij}(f(i)-f(j))^2\}, \tag{10}$$

where $w_{ij} = \langle \hat{n}_i, \hat{n}_j \rangle$

For example, Equation (10) illustrates an approach for refinement where radiance R is the current feature $f_{curr}$. For example, the electronic device 102 may perform refinement in accordance with Equation (9) and/or Equation (10). In some approaches, refining may be performed as follows. It may be beneficial to have the refined feature of each voxel close to the mean feature of that voxel in the canonical model (which may correspond to the data fidelity term defined in Equation (9) and/or Equation (10), for example). For the regularization term, $w_{ij}$ (the inner product of the normals of two neighboring voxels) preserves the geometry information of the surface. For example, when the two neighboring voxels are both on the same smooth surface, the inner product tends toward 1. Thus, the smoothness constraint may be enforced on the refined optical feature of neighboring voxels. In other words, the refined optical features of those neighboring voxels may be similar. Otherwise, if the inner product tends towards 0 (which may mean that the neighboring voxels are on an edge, within the object, and/or belong to the background, for instance), then the smoothness constraint enforced on the neighboring voxels may be relaxed.

The processor 112 may include and/or implement a reconstructor 124. The reconstructor 124 may reconstruct a 3D object based on the canonical model. The term "reconstruct" and variations thereof may include producing a 3D model of the 3D object. For example, the reconstructor 124 may produce a virtual model of the 3D object in a virtual space. Reconstructing the 3D object may include reconstructing color of the 3D object based on the canonical model (that includes geometric information and recoverable color, for example). For instance, in order to reconstruct a color texture from the canonical model, the feature may include a color-recoverable feature (e.g., RGB, YUV, radiance, etc.). The reconstructed 3D object may be presented (e.g., shown on a display, sent to another electronic device, printed with a 3D printer, etc.).

In some configurations, reconstructing the 3D object based on the canonical model may include extracting an iso-surface of the 3D object from a volume of the canonical model and/or extracting color from the canonical model that is associated with the iso-surface to produce the reconstructed 3D object. For example, the reconstructor 124 may extract an iso-surface from the volume of the canonical model and may use the color associated with the iso-surface to create a texture mapping to produce the reconstructed 3D object. In some approaches, the reconstructor 124 uses the optical information (e.g., optical features, RGB, YUV, radiance, f, R, etc.) from the tensors associated with the voxels of the canonical model to extract the color and produce a color texture, which may be mapped to the iso-surface.

In some configurations of the system and methods disclosed herein, an automatic outlier removing technique may be performed by the electronic device 102 to generate the moving mean for each voxel. For example, the electronic device 102 may utilize an adaptive threshold to reject outliers when generating the moving mean for each voxel. In this way, the registration, fusion, and/or reconstruction may be more robust to the noise and outliers resulting from the environment and/or sensors. Moreover, the reconstructed texture can have a more dynamic range.

In some configurations, by using radiance as the color recoverable feature, the electronic device 102 (or another electronic device) may apply relighting using the following model, expressed in Equation (11), before the final reconstruction. Relighting may enable a change in the appearance of lighting on an object and/or scene of the final reconstruction. This may be beneficial to give an object and/or scene a desired lighting (e.g., angle of lighting, amount of lighting, etc.). It should be noted that the value of r depends on the lighting model. For example, different r terms may be utilized based on the lighting model.

$$I = f(R),$$ (11)

$$R = L\Delta t,$$

$$R_{old} = L\Delta t_{old},$$

$$R_{new} = L\Delta t_{new},$$

$$R_{new} = R_{old} \frac{t_{new}}{t_{old}},$$

$$r = \frac{t_{new}}{t_{old}},$$

$$R_{new} \xrightarrow{f} I_{new}$$

In Equation (11), I is an intensity of the pixel, R is a corresponding radiance, f is the functional mapping from radiance to intensity, L is radiance for unit time, Δt is the exposure time, $R_{old}$ is the radiance before relighting, $t_{old}$ is the exposure time before relighting, $R_{new}$ is the target radiance after relighting, and $t_{new}$ is the target exposure time after relighting. Thus, relighting can be done by implicitly reducing and/or increasing exposure time via directly tuning r (a relative ratio). Relighting may be applied to change the lighting of a scene shown by one or more frames.

In some configurations, the non-local mean (e.g., temporal mean, a mean over multiple frames in time, a mean that is not spatially dependent, not dependent on neighboring voxels or pixels, etc.) Gaussian may be beneficial for the final reconstruction. In comparison to a local mean assumption or an independent and identically distributed (i.i.d.) Gaussian assumption, for example, some configurations of the systems and methods may utilize the non-local mean Gaussian such that details can be preserved. Temporal consistency (e.g., smoothness over frames) may be preserved by the non-local mean Gaussian approach. In some configurations, a geometry constraint may be preserved via the (geometry-preserving) feature refinement technique(s) described herein.

In some configurations, the electronic device 102 (e.g., processor 112) may optionally be coupled to, be part of (e.g., be integrated into), include, and/or implement one or more kinds of devices. For example, the electronic device 102 may be implemented in a vehicle equipped with one or more cameras. In another example, the electronic device 102 may be implemented in a drone equipped with one or more cameras. In other examples, the electronic device 102 (e.g., processor 112) may be implemented in a camera, server, or a smartphone.

In some configurations, the electronic device 102 may be a network device (e.g., server, cloud device, etc.) that communicates with one or more other devices. For example, the electronic device 102 may communicate with one or more autonomous vehicles, self-driving vehicles, semi-autonomous vehicles, computers, smartphones, and/or tablet devices, etc. For instance, the electronic device 102 may receive data (e.g., frame data and/or pose data, etc.) from one or more remote devices. The electronic device 102 may perform one or more of the techniques described herein (e.g., registration, fusion, refining, reconstruction, etc.) and may provide one or more outputs (e.g., reconstructed 3D object, registered frames, updated canonical model, fused data, re-lit scene, etc.) to the one or more remote devices.

In some configurations, one or more of the components or elements described in connection with FIG. 1 may be combined and/or divided. For example, the modeler 136 and/or reconstructor 124 may be combined into an element that performs the functions of the modeler 136 and the reconstructor 124. In another example, the modeler 136 may be divided into a number of separate components or elements that perform a subset of the functions associated with the modeler 136.

Figure 2:
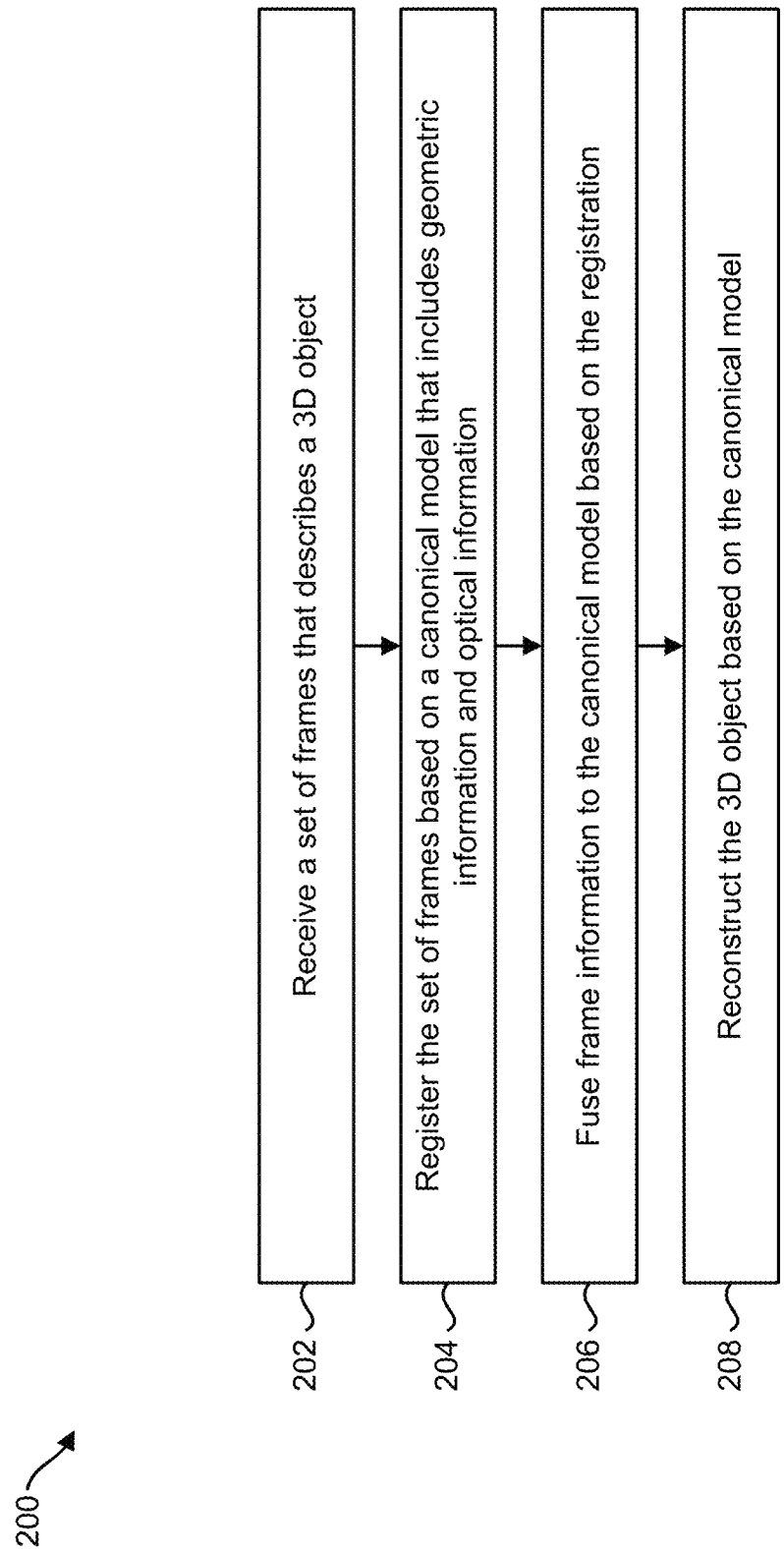
FIG. 2 is a flow diagram illustrating one configuration of a method for reconstructing a moving 3D object.

FIG. 2 is a flow diagram illustrating one configuration of a method 200 for reconstructing a moving 3D object. The method 200 may be performed by the electronic device 102 described in connection with FIG. 1. The electronic device 102 may receive 202 a set of frames that describes a 3D object. This may be accomplished as described in connection with FIG. 1. For example, the electronic device 102 may obtain sensor data (e.g., one or more image frames and/or one or more depth image frames). In some configurations, the electronic device 102 may extract one or more key frames as the set of frames.

The electronic device 102 may register 204 the set of frames based on a canonical model that includes geometric information and optical information. This may be accomplished as described in connection with FIG. 1. For example, the electronic device 102 may initialize a canonical model based on one or more initial frames. For instance, the electronic device 102 may determine a tensor for each voxel of the canonical model, where each tensor includes geometric information (e.g., d) and optical information (e.g., $\mu_f$, $\mu_{f^2}$, $\mu_R$, $\mu_{R^2}$, RGB data, YUV data, and/or radiance data, etc.). In some configurations, the electronic device 102 may fit a temporal (e.g., non-local) mean Gaussian model to each voxel of the set of voxels of the canonical model. Additionally or alternatively, the electronic device 102 may determine a transformation or warp to register one or more frames by minimizing an energy function (with respect to the transformation or warp). The energy function may be based on a point-to-plane distance between the canonical model and a depth for a frame and/or a distance metric between optical data of the frame and the optical information of the canonical model.

The electronic device 102 may fuse 206 frame information to the canonical model based on the registration. This may be accomplished as described in connection with FIG. 1. For example, the electronic device 102 may fuse selected frame information (e.g., geometry information and/or optical information) of one or more frames (e.g., each of the frames, the set of frames, registered frames, etc.) to the canonical model and/or update at least one tensor associated with the canonical model.

The electronic device 102 may reconstruct 208 the 3D object based on the canonical model. This may be accomplished as described in connection with FIG. 1. For example, the electronic device 102 may extract an iso-surface of the 3D object from a volume of the canonical model and/or extract color from the canonical model that is associated with the iso-surface to produce a reconstructed 3D object.

In some configurations, the electronic device 102 may present the reconstructed 3D object. For example, the electronic device 102 may show the reconstructed 3D object on one or more displays (e.g., smartphone display, virtual reality headset displays, augmented reality headset displays, etc.), send the reconstructed 3D object to another electronic device, and/or print a model of the reconstructed 3D object with a 3D printer, etc. In some configurations, the electronic device 102 may enable manipulation of the reconstructed 3D object. For example, the electronic device 102 may receive input via one or more input devices to enable shifting, rotating, and/or modifying the reconstructed 3D object.

In some configurations, the electronic device 102 may perform one or more operations with the reconstructed 3D model. For example, the reconstructed 3D model (and/or refined data) may be transmitted to a remote device (e.g., cloud device, remote server, and/or one or more vehicles). The electronic device 102 and/or a remote device may utilize the reconstructed 3D model in generating and/or updating a map in some approaches. In another example, the electronic device 102 may perform one or more navigation operations (e.g., route planning and/or movement control, etc.) based on the 3D data. For instance, the electronic device 102 may plan a route and/or control movement to avoid colliding with one or more objects indicated by the reconstructed 3D model. In yet another example, the electronic device 102 may segment one or more objects from a scene based on the reconstructed 3D model. In yet another example, the electronic device 102 may present the reconstructed 3D model for viewing and/or manipulation. In yet another example, the electronic device 102 may produce a 3D virtual environment based on the reconstructed 3D model. In yet another example, the electronic device 102 may generate augmented reality content based on the reconstructed 3D model. For instance, the electronic device 102 may insert one or more virtual objects (e.g., people, structures, virtual furniture, and/or environmental effects, etc.) into the reconstructed 3D model.

It should be noted that some configurations of the systems and methods disclosed herein may be performed online. For example, the electronic device 102 may perform registration and/or reconstruction while one or more frames are being received (e.g., captured). For instance, registration and/or reconstruction may be performed based on one or more frames as they are being received and/or captured, before all of the frames for a 3D object are received and/or captured. In other configurations, the electronic device 102 may perform registration and/or reconstruction "offline," after all of the frames for a 3D object are received and/or captured.

As can be observed 3D reconstruction algorithms, especially those with non-rigid motion, may utilize a canonical model to store aligned 3D geometry information of the object. The canonical model may be used as a reference during the entire alignment procedure. As described herein, a truncated distance may be associated with each voxel of the canonical model. Optical information (e.g., color information, recoverable color information, features that include color, etc.) may be associated with each voxel of the canonical model in accordance with some configurations of the systems and methods disclosed herein. Utilizing the color information in the canonical model may be beneficial by enabling color information to be leveraged in the registration procedure.

In some techniques, however, color information associated with the 3D model is not utilized in the canonical model for registration. Consequently, reconstruction may be a mesh, based on geometry only. Some techniques may utilize an albedo-model-based basis function. For each round of the registration, the coefficients associated with the albedo model need to be estimated. In other techniques, after registration using only geometry information (e.g., depth), the resulting warping is applied to color or radiance for the voxels to update the color.

Figure 3:
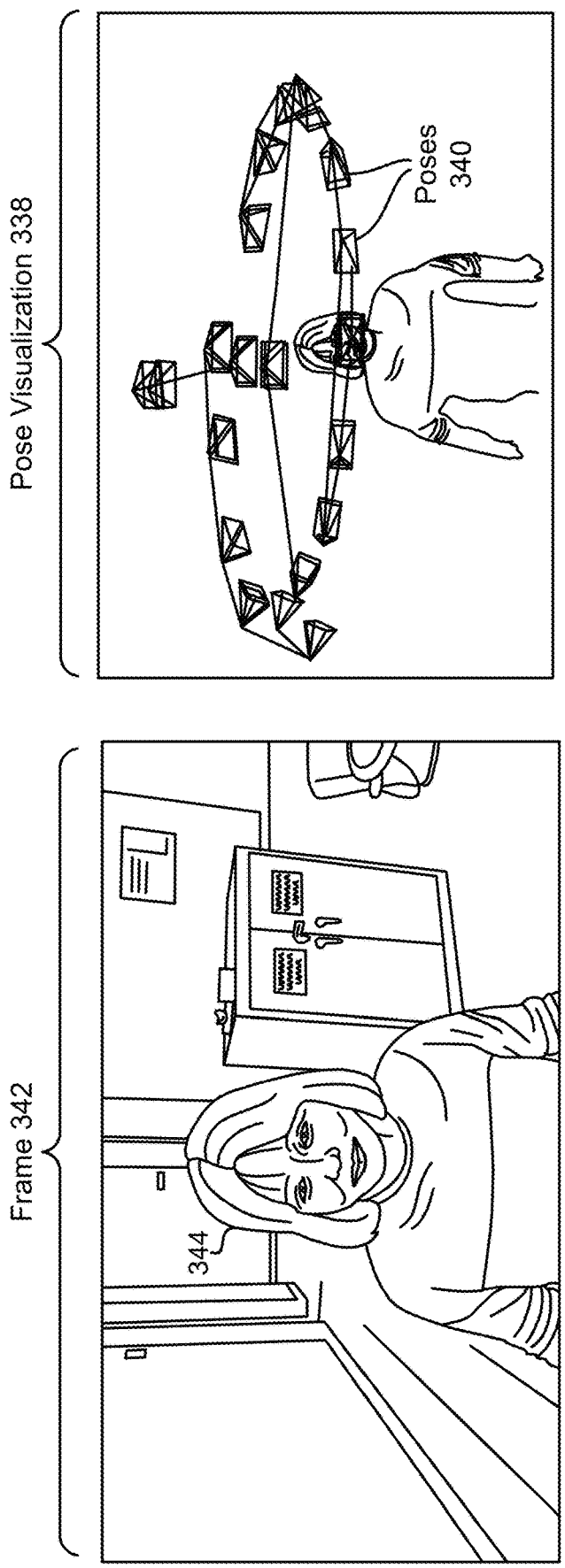
FIG. 3 is a diagram illustrating an example of a frame and a pose visualization.

FIG. 3 is a diagram illustrating an example of a frame 342 and a pose visualization 338. In this example, the frame 342 is an image frame describing a person 344 (one example of a 3D object). In some configurations, for instance, a frame of input red green blue (RBG) video may be obtained. In order to create a 3D model of the person, several frames may be captured from different poses 340. As illustrated in the pose visualization 338 (e.g., a tracking view), several frames (e.g., key frames) may be obtained with corresponding poses 340. In particular, the pose visualization 338 illustrates several poses of frame capture around the person depicted in the frame 342. The electronic device 102 may utilize the captured frames at the different poses 340 to register a set of frames and/or reconstruct a virtual 3D model of the person 344.

Several variations of methods for reconstructing a moving 3D object are presented in connection with FIGS. 4-7. It should be noted that one or more steps, functions, procedures, operations, etc., described in connection with FIGS. 4-7 may be combined and/or omitted in accordance with the systems and methods disclosed herein.

Figure 4:
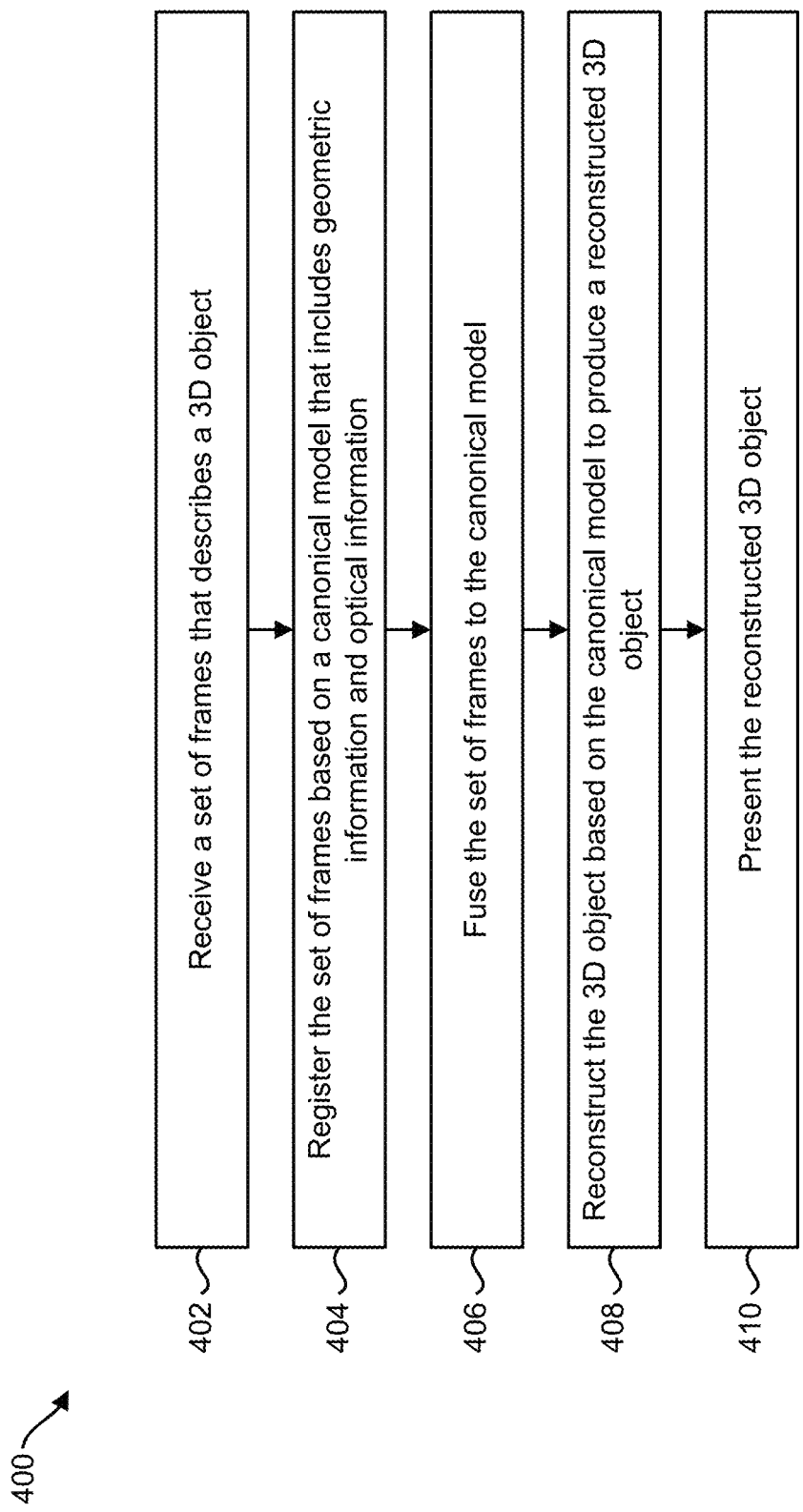
FIG. 4 is a flow diagram illustrating a method for reconstructing a moving 3D object.

FIG. 4 is a flow diagram illustrating a method 400 for reconstructing a moving 3D object. The method 400 may be performed by the electronic device 102 described in connection with FIG. 1. The electronic device 102 may receive 402 a set of frames that describes a 3D object. This may be accomplished as described in connection with one or more of FIGS. 1-2.

The electronic device 102 may register 404 the set of frames based on a canonical model that includes geometric information and optical information. This may be accomplished as described in connection with one or more of FIGS. 1-2.

The electronic device 102 may fuse 406 the set of frames to the canonical model. This may be accomplished as described in connection with FIG. 1. For example, the electronic device 102 may fuse one or more frames (e.g., pixel data, depth data, color information, geometric information, etc.) with the canonical model. In some configurations, the fuser 120 may fuse selected features of the frame(s) (e.g., optical data and/or radiance, etc.) to the canonical model.

The electronic device 102 may reconstruct 408 the 3D object based on the canonical model to produce a reconstructed 3D object. This may be accomplished as described in connection with one or more of FIGS. 1-2.

The electronic device 102 may present 410 the reconstructed 3D object. This may be accomplished as described in connection with one or more of FIGS. 1-2.

Figure 5:
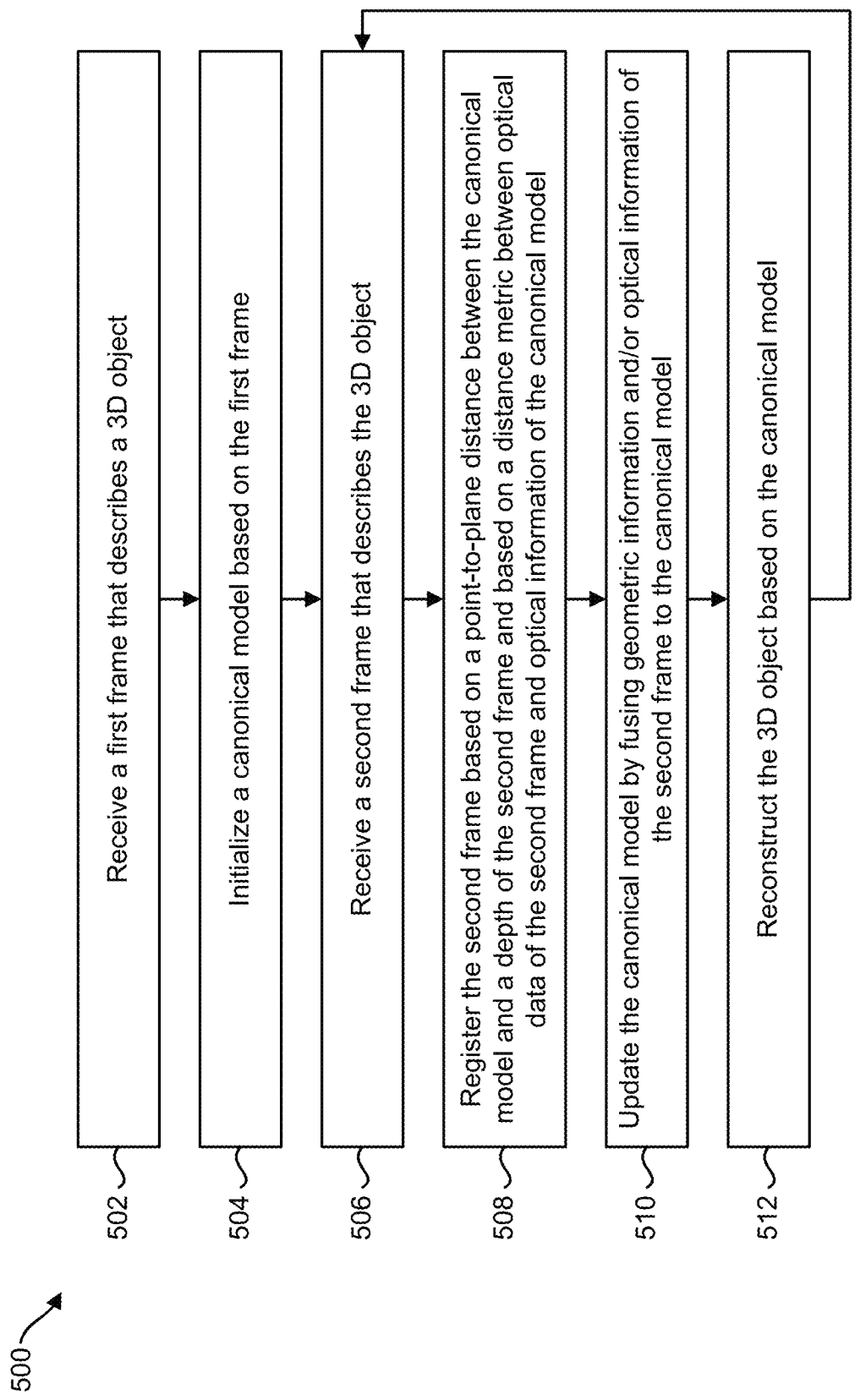
FIG. 5 is a flow diagram illustrating another method for reconstructing a moving 3D object.

FIG. 5 is a flow diagram illustrating another method 500 for reconstructing a moving 3D object. The method 500 may be performed by the electronic device 102 described in connection with FIG. 1. The electronic device 102 may receive 502 a first frame that describes a 3D object. This may be accomplished as described in connection with one or more of FIGS. 1-2.

The electronic device 102 may initialize 504 a canonical model based on the first frame. This may be accomplished as described in connection with one or more of FIGS. 1-2. For example, the electronic device 102 may utilize the first frame of data (e.g., depth data and/or optical data) to determine a tensor for each voxel of the canonical model, where each tensor includes geometric information (e.g., d) and optical information (e.g., $\mu_I$, $\mu_{I^2}$, $\mu_R$, $\mu_{R^2}$, RGB data, YUV data, and/or radiance data, etc.).

The electronic device 102 may receive 506 a second frame that describes the 3D object. This may be accomplished as described in connection with one or more of FIGS. 1-2. For example, the electronic device 102 may receive 506 a subsequent frame that describes the 3D object. The second frame may be captured from a different pose than a previous frame. In some configurations, the subsequent frame may be a key frame.

The electronic device 102 may register 508 the second frame based on a point-to-plane distance between the canonical model and a depth of the frame and based on a distance metric between optical data of the second frame and optical information of the canonical model. This may be accomplished as described in connection with one or more of FIGS. 1-2. For example, the electronic device 102 may determine a point-to-plane distance in accordance with Equation (3) and a distance metric in accordance with Equation (4). The electronic device 102 may add Equation (3) and Equation (4) and minimize the point-to-plane distance and the distance metric with regards to the transform or warping (e.g., $T^n(v)$) to register 508 the second frame. For example, the electronic device 102 may transform or warp the canonical model to the second frame using the determined transform or warping to register 508 the second frame with the canonical model. It should be noted that although Equation (4) is based on radiance, other distance metrics based on other optical information (e.g., RGB, YUV, etc.) may be similarly determined and/or utilized in accordance with the systems and methods disclosed herein.

The electronic device 102 may update 510 the canonical model by fusing geometric information and/or optical information of the second frame (e.g., registered frame) to the canonical model. This may be accomplished as described in connection with one or more of FIGS. 1-2. For example, the electronic device 102 may fuse information from the registered frame to voxels of the canonical model.

The electronic device 102 may reconstruct 512 the 3D object based on the canonical model. This may be accomplished as described in connection with one or more of FIGS. 1-2. It should be noted that one or more of the operations, steps, functions, procedures, etc., described here may be repeated. For example, FIG. 5 illustrates that one or more functions may be repeated for a subsequent frame. For instance, a subsequent frame may be received 506, the subsequent frame may be registered 508, the canonical model may be updated 510, and/or the 3D object may be reconstructed 512 by the electronic device 102.

Figure 6:
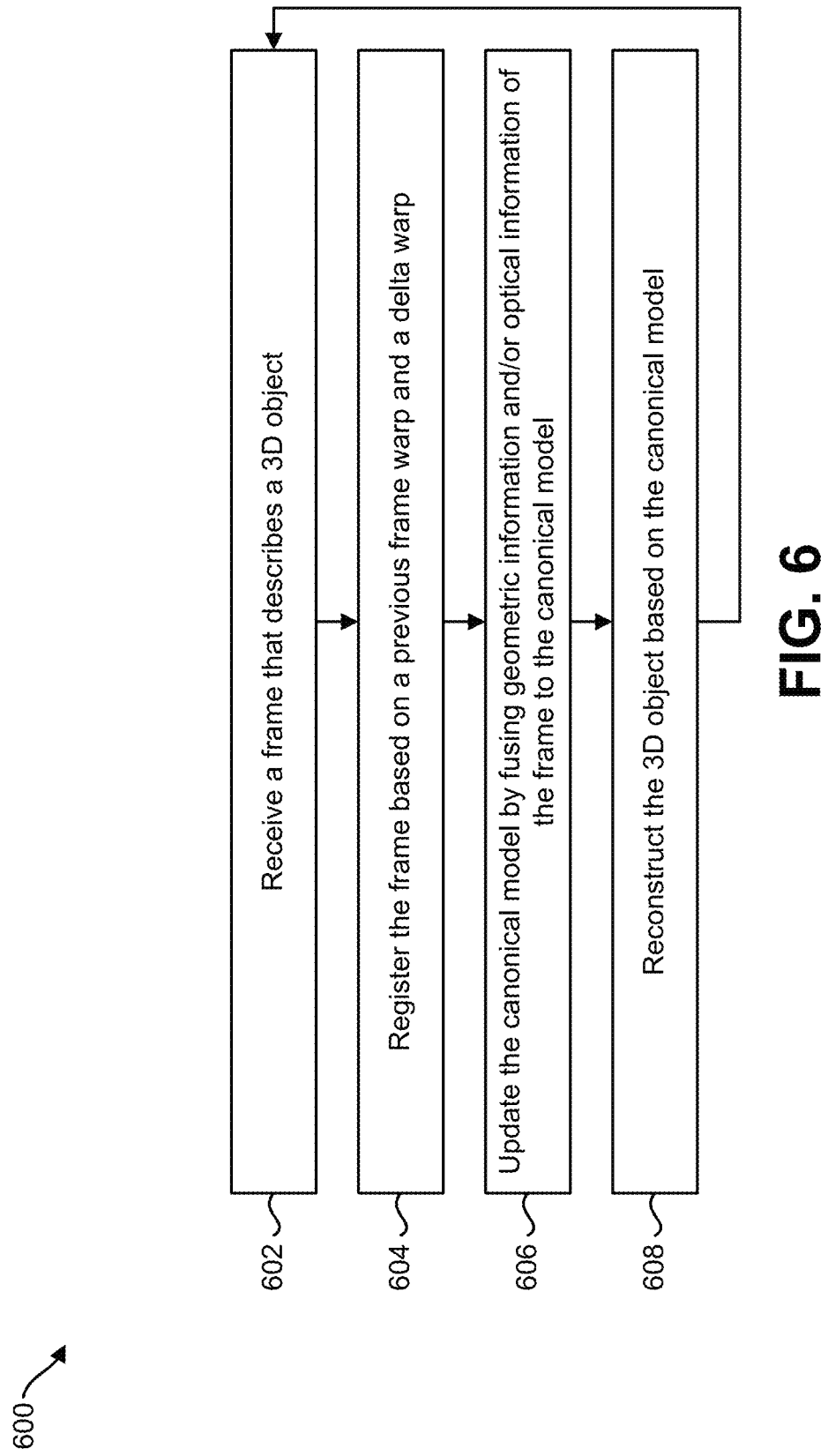
FIG. 6 is a flow diagram illustrating another method for reconstructing a moving 3D object.

FIG. 6 is a flow diagram illustrating another method 600 for reconstructing a moving 3D object. The method 600 may be performed by the electronic device 102 described in connection with FIG. 1. The electronic device 102 may receive 602 a frame that describes a 3D object. This may be accomplished as described in connection with one or more of FIGS. 1-2. The frame may be a frame subsequent to an initial frame. For example, the frame may be received after the canonical model has been initialized based on an initial frame.

The electronic device 102 may register 604 the frame based on a previous frame warp and a delta warp. This may be accomplished as described in connection with FIG. 1. For example, the electronic device 102 may apply a previous frame warp ($T^{n-1}$) to the canonical model to produce a warped canonical model. Then, the electronic device 102 may register 604 the current frame with the warped canonical model in accordance with the delta warp ($\Delta T$). Accordingly, the electronic device 102 may compose the previous frame warp ($T^{n-1}$) and the delta warp ($\Delta T$) to determine the current frame warp or transformation ($T^n$) (in accordance with Equation (5), for example). In some configurations, the electronic device 102 may perform the registration (for the delta warp, for instance) between the warped canonical model and the current frame by minimizing an energy function (with respect to the transformation or warp). The energy function may be based on a point-to-plane distance between the canonical model and a depth for a frame and/or a distance metric between optical data of the frame and the optical information of the canonical model.

The electronic device 102 may update 606 the canonical model by fusing geometric information and/or optical information of the frame (e.g., registered frame) to the canonical model. This may be accomplished as described in connection with one or more of FIGS. 1-2. For example, the electronic device 102 may fuse information from the registered frame to voxels of the canonical model.

The electronic device 102 may reconstruct 608 the 3D object based on the canonical model. This may be accomplished as described in connection with FIG. 1. For example, the electronic device 102 may extract an iso-surface of the 3D object from a volume of the canonical model and/or extract color from the canonical model that is associated with the iso-surface to produce a reconstructed 3D object. In some configurations, the electronic device 102 may repeat one or more steps of the method 600. For example, the electronic device 102 may receive 602 a next frame and register 604 the next frame based on the most recent frame warp and a delta warp, etc.

Figure 7:
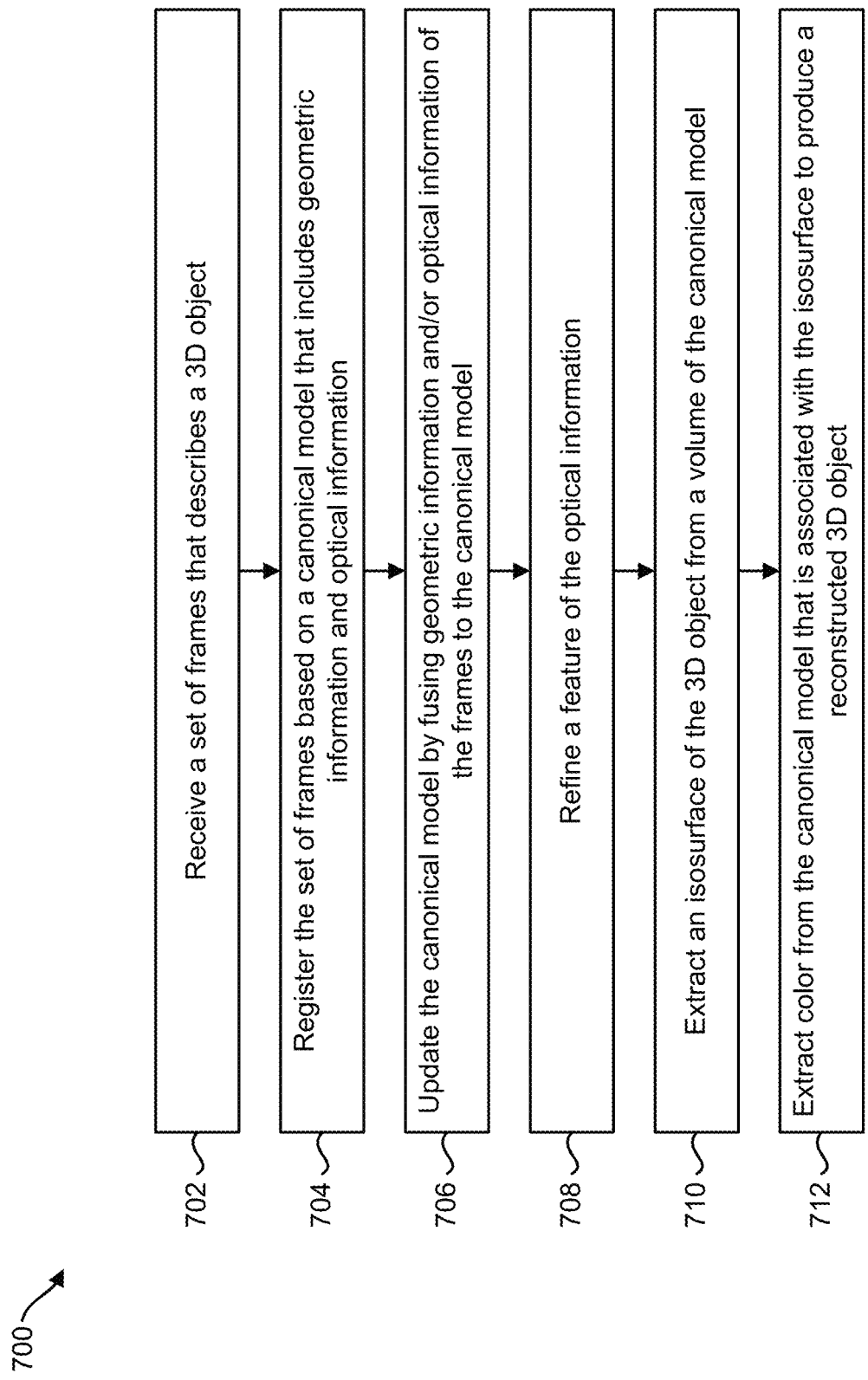
FIG. 7 is a flow diagram illustrating another method for reconstructing a moving 3D object.

FIG. 7 is a flow diagram illustrating another method 700 for reconstructing a moving 3D object. The method 700 may be performed by the electronic device 102 described in connection with FIG. 1. The electronic device 102 may receive 702 a set of frames that describes a 3D object. This may be accomplished as described in connection with one or more of FIGS. 1-2.

The electronic device 102 may register 704 the set of frames based on a canonical model that includes geometric information and optical information. This may be accomplished as described in connection with one or more of FIGS. 1-2.

The electronic device 102 may update 706 the canonical model by fusing geometric information and/or optical information of the frames (e.g., the set of registered frames) to the canonical model. This may be accomplished as described in connection with one or more of FIGS. 1-2. For example, the electronic device 102 may fuse information from the registered frames to voxels of the canonical model.

The electronic device 102 may refine 708 a feature of the optical information. This may be accomplished as described in connection with FIG. 1. In some examples, the electronic device 102 may perform refinement in accordance with Equation (9) and/or Equation (10). In some configurations, the smoothness constraint may be enforced on the refined optical feature of neighboring voxels. In other words, the refined optical features of those neighboring voxels may be similar. Otherwise, if the inner product tends towards 0 (which may mean that the neighboring voxels are on an edge, within the object, and/or belong to the background, for instance), then the smoothness constraint enforced on the neighboring voxels may be relaxed.

The electronic device 102 may extract 710 an iso-surface of the 3D object from a volume of the canonical model. This may be accomplished as described in connection with one or more of FIGS. 1-2. For example, the electronic device 102 may determine a surface of the 3D object based on the canonical model. For instance, the electronic device 102 may determine a surface in a 3D space based on the geometrical information and/or tensors (e.g., distance values, truncated distance function values, depth values, etc.) of the canonical model. In some approaches, voxels with particular distance values (e.g., d=0) may indicate the location of the surface of the 3D object in the 3D space. The electronic device 102 may produce a surface in the 3D space corresponding to the voxels that indicate the location of the 3D object surface. For example, the electronic device 102 may determine a surface that intersects with the voxels of the canonical model that indicate a surface and/or that have a particular value (or range of values).

The electronic device 102 may extract 712 color from the canonical model that is associated with the iso-surface to produce a reconstructed 3D object. This may be accomplished as described in connection with one or more of FIGS. 1-2. For example, the electronic device 102 may retrieve (from the canonical model in memory, for instance), reconstruct, and/or recover color from the voxels (e.g., tensors associated with the voxels) of the canonical model that correspond to the iso-surface. For instance, the electronic device 102 may reconstruct color (e.g., a color texture) of the 3D object based on the canonical model that includes recoverable color (e.g., one or more features with recoverable color). In some configurations, the electronic device 102 may reconstruct the color of the 3D object by applying the color (e.g., mapping the color texture) to the iso-surface. For example, the electronic device 102 may render the reconstructed 3D object (e.g., iso-surface) with the color from the canonical model. As described herein, the electronic device 102 may present the reconstructed 3D object.

FIG. 8 is a diagram illustrating an example of a frame 844 and a 3D reconstruction 846. As described herein, the electronic device 102 may receive (e.g., capture, receive from another device, etc.) a set of frames. The frame 844 may be an example of one of a set of frames. For example, one or more of the set of frames may be captured from different perspectives. As described herein, the electronic device 102 may utilize the set of frames to produce and/or update a canonical model that includes geometrical information and optical information. For example, the frame 844 may be utilized to determine the optical information (e.g., color-recoverable feature(s) in tensors) of the canonical model. Depth information corresponding to the frame 844 may be utilized to determine the geometrical information (e.g., distance values in the tensors) of the canonical model. As described herein, the electronic device 102 may utilize the canonical model to produce a 3D reconstruction 846. For instance, both geometrical information and optical information may be utilized to perform registration and/or fusion of frames. In this example, the 3D reconstruction 846 depicts a person, which may be an example of a reconstructed 3D object. Other 3D objects may be reconstructed.

Figure 9:
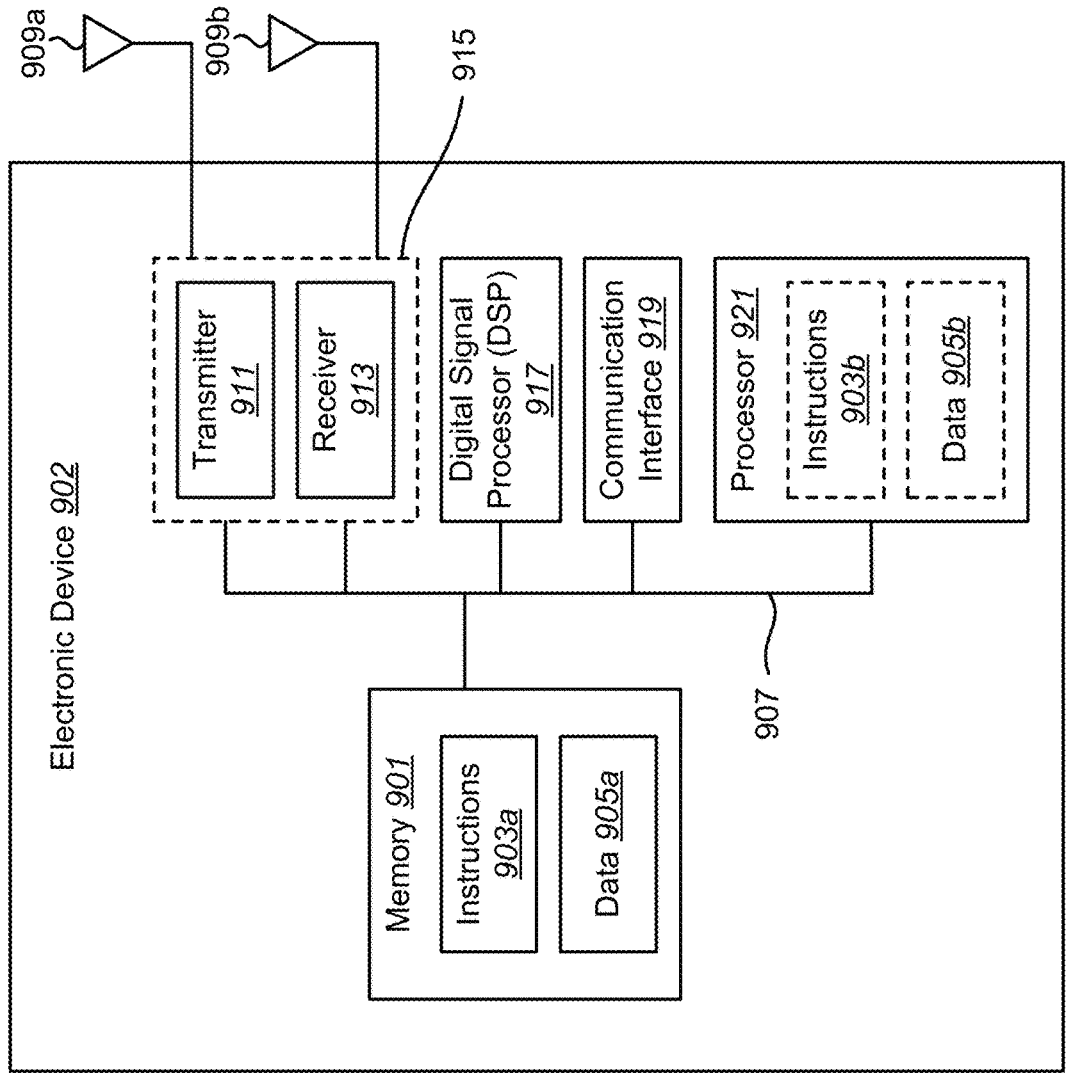
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. Examples of the electronic device 902 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, mounted cameras, connected cameras, robots, aircraft, drones, unmanned aerial vehicles (UAVs), gaming consoles, personal digital assistants (PDAs), etc. The electronic device 902 may be implemented in accordance with one or more of the electronic devices (e.g., electronic device 102) described herein.

The electronic device 902 includes a processor 921. The processor 921 may be a general purpose single- or multi-chip microprocessor (e.g., an ARM), a special purpose microprocessor (e.g., a digital signal processor (DSP)), a microcontroller, a programmable gate array, etc. The processor 921 may be referred to as a central processing unit (CPU). Although just a single processor 921 is shown in the electronic device 902, in an alternative configuration, a combination of processors (e.g., an ARM and DSP) could be implemented.

The electronic device 902 also includes memory 901. The memory 901 may be any electronic component capable of storing electronic information. The memory 901 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 905a and instructions 903a may be stored in the memory 901. The instructions 903a may be executable by the processor 921 to implement one or more of the methods, procedures, steps, and/or functions described herein. Executing the instructions 903a may involve the use of the data 905a that is stored in the memory 901. When the processor 921 executes the instructions 903, various portions of the instructions 903b may be loaded onto the processor 921 and/or various pieces of data 905b may be loaded onto the processor 921.

The electronic device 902 may also include a transmitter 911 and/or a receiver 913 to allow transmission and reception of signals to and from the electronic device 902. The transmitter 911 and receiver 913 may be collectively referred to as a transceiver 915. One or more antennas 909a-b may be electrically coupled to the transceiver 915. The electronic device 902 may also include (not shown) multiple transmitters, multiple receivers, multiple transceivers and/or additional antennas.

The electronic device 902 may include a digital signal processor (DSP) 917. The electronic device 902 may also include a communication interface 919. The communication interface 919 may allow and/or enable one or more kinds of input and/or output. For example, the communication interface 919 may include one or more ports and/or communication devices for linking other devices to the electronic device 902. In some configurations, the communication interface 919 may include the transmitter 911, the receiver 913, or both (e.g., the transceiver 915). Additionally or alternatively, the communication interface 919 may include one or more other interfaces (e.g., touchscreen, keypad, keyboard, microphone, camera, etc.). For example, the communication interface 919 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 907.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should also be noted that one or more steps and/or actions may be added to the method(s) and/or omitted from the method(s) in some configurations of the systems and methods disclosed herein.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and electronic device described herein without departing from the scope of the claims.

What is claimed is:

1. A method performed by an electronic device, comprising:
    receiving a set of frames, wherein the set of frames describes a moving three-dimensional (3D) object;
    registering the set of frames based on a canonical model and a visual spectrum information difference, wherein the canonical model comprises geometric information and optical information;
    fusing frame information of each frame to the canonical model based on the registration; and
    reconstructing the 3D object based on the canonical model.

2. The method of claim 1, further comprising fitting a temporal mean Gaussian model to each voxel of a set of voxels of the canonical model and associated pixels in the set of frames.

3. The method of claim 2, wherein each voxel of the set of voxels has an associated tensor.

4. The method of claim 3, wherein each tensor comprises a distance value, a mean of a feature vector, a mean of a product between the feature vector and a transpose of the feature vector, and an update number.

5. The method of claim 4, wherein the distance value represents at least a portion of the geometric information and the mean of the feature vector represents at least a portion of the optical information.

6. The method of claim 1, wherein registering a frame of the set of frames comprises determining, based on the visual spectrum information difference, a distance metric between optical data of the frame and the optical information of the canonical model.

7. The method of claim 6, wherein the registering the frame further comprises determining a point-to-plane distance between the canonical model and a depth for the frame.

8. The method of claim 1, wherein fusing the frame information comprises incrementally updating at least one tensor of the canonical model by performing weighted fusing of the frame information to the canonical model.

9. The method of claim 1, further comprising refining a feature of the optical information before reconstructing color of the 3D object.

10. The method of claim 1, further comprising reconstructing color of the 3D object based on the canonical model that includes recoverable color.

11. The method of claim 1, wherein reconstructing the 3D object based on the canonical model comprises:
    extracting an iso-surface of the 3D object from a volume of the canonical model; and
    extracting color from the canonical model that is associated with the iso-surface to produce a reconstructed 3D object.

12. An electronic device, comprising:
    a memory;
    a processor coupled to the memory, wherein the processor is configured to:
        receive a set of frames, wherein the set of frames describes a moving three-dimensional (3D) object;
        register the set of frames based on a canonical model and a visual spectrum information difference, wherein the canonical model comprises geometric information and optical information;
        fuse frame information of each frame to the canonical model based on the registration; and
        reconstruct the 3D object based on the canonical model.

13. The electronic device of claim 12, wherein the processor is configured to fit a temporal mean Gaussian model to each voxel of a set of voxels of the canonical model and associated pixels in the set of frames.

14. The electronic device of claim 13, wherein each voxel of the set of voxels has an associated tensor.

15. The electronic device of claim 14, wherein each tensor comprises a distance value, a mean of a feature vector, a mean of a product between the feature vector and a transpose of the feature vector, and an update number.

16. The electronic device of claim 15, wherein the distance value represents at least a portion of the geometric information and the mean of the feature vector represents at least a portion of the optical information.

17. The electronic device of claim 12, wherein the processor is configured to register a frame of the set of frames by determining, based on the visual spectrum information difference, a distance metric between optical data of the frame and the optical information of the canonical model.

18. The electronic device of claim 17, wherein the processor is configured to register the frame by determining a point-to-plane distance between the canonical model and a depth for the frame.

19. The electronic device of claim 12, wherein the processor is configured to fuse the frame information by incrementally updating at least one tensor of the canonical model by performing weighted fusing of the frame information to the canonical model.

20. The electronic device of claim 12, wherein the processor is configured to refine a feature of the optical information before reconstructing color of the 3D object.

21. The electronic device of claim 12, wherein the processor is configured to reconstruct color of the 3D object based on the canonical model that includes recoverable color.

22. The electronic device of claim 12, wherein the processor is configured to reconstruct the 3D object based on the canonical model by:
extracting an iso-surface of the 3D object from a volume of the canonical model; and
extracting color from the canonical model that is associated with the iso-surface to produce a reconstructed 3D object.

23. A non-transitory tangible computer-readable medium storing computer executable code, comprising:
code for causing an electronic device to receive a set of frames, wherein the set of frames describes a moving three-dimensional (3D) object;
code for causing the electronic device to register the set of frames based on a canonical model and a visual spectrum information difference, wherein the canonical model comprises geometric information and optical information;
code for causing the electronic device to fuse frame information of each frame to the canonical model based on the registration; and
code for causing the electronic device to reconstruct the 3D object based on the canonical model.

24. The computer-readable medium of claim 23, further comprising code for causing the electronic device to fit a temporal mean Gaussian model to each voxel of a set of voxels of the canonical model and associated pixels in the set of frames.

25. The computer-readable medium of claim 23, wherein the code for causing the electronic device to register a frame of the set of frames comprises code for causing the electronic device to determine, based on the visual spectrum information difference, a distance metric between optical data of the frame and the optical information of the canonical model.

26. The computer-readable medium of claim 23, wherein the code for causing the electronic device to fuse the frame information comprises code for causing the electronic device to incrementally update at least one tensor of the canonical model by performing weighted fusing of the frame information to the canonical model.

27. An apparatus, comprising:
means for receiving a set of frames, wherein the set of frames describes a moving three-dimensional (3D) object;
means for registering the set of frames based on a canonical model and a visual spectrum information difference, wherein the canonical model comprises geometric information and optical information;
means for fusing frame information of each frame to the canonical model based on the registration; and
means for reconstructing the 3D object based on the canonical model.

28. The apparatus of claim 27, further comprising means for fitting a temporal mean Gaussian model to each voxel of a set of voxels of the canonical model and associated pixels in the set of frames.

29. The apparatus of claim 27, wherein the means for registering a frame of the set of frames comprises means for determining, based on the visual spectrum information difference, a distance metric between optical data of the frame and the optical information of the canonical model.

30. The apparatus of claim 27, wherein the means for fusing the frame information comprises means for incrementally updating at least one tensor of the canonical model by performing weighted fusing of the frame information to the canonical model.

* * * * *